United States Patent [19]

Zahorsky

[11] 4,158,837

[45] Jun. 19, 1979

[54] INFORMATION DISPLAY APPARATUS

[75] Inventor: James T. Zahorsky, Saugerties, N.Y.

[73] Assignee: International Business Machines Corporation, Armonk, N.Y.

[21] Appl. No.: 797,725

[22] Filed: May 17, 1977

[51] Int. Cl.[2] .................................................. G06F 3/14

[52] U.S. Cl. ................................ 340/804; 340/152 R; 340/706; 340/747; 340/750; 340/798

[58] Field of Search ........... 340/324 A, 324 AD, 152, 340/154

[56] References Cited

U.S. PATENT DOCUMENTS

| | | | |
|---|---|---|---|
| 3,524,181 | 8/1970 | Criscimagna et al. | 340/324 AD |
| 3,524,182 | 8/1970 | Criscimagna et al. | 340/324 AD |
| 3,559,208 | 1/1971 | Giugno et al. | 340/324 AD |
| 3,750,135 | 7/1973 | Carey et al. | 340/324 AD |
| 3,792,462 | 2/1974 | Casey et al. | 340/324 AD |
| 3,827,041 | 7/1974 | Cook | 340/324 AD |

*Primary Examiner*—Marshall M. Curtis

*Attorney, Agent, or Firm*—Frederick D. Poag

[57] ABSTRACT

A display system is shown which has a source of coded information in display mapped format and includes plural devices for decoding and utilizing the information in accordance with its position in that mapped format. In the illustrated embodiment, the source includes a refresh buffer and the utilization devices include an attribute decoder and a character generator. A character row counter controls gating which causes the apparatus to treat bytes of data, having attribute format, truly as attributes or as addresses of members of an extra, graphical character set of the character generator.

8 Claims, 4 Drawing Figures

INFORMATION DISPLAY APPARATUS

FIELD OF THE INVENTION

This invention relates to apparatus for displaying coded information, and more particularly to an information outputting system having a display screen and means for decoding and presenting various items of information at predetermined positions on the screen.

BACKGROUND OF THE INVENTION

In the prior art of information display, coded information has been decoded or interpreted selectively for enabling use of the code bit patterns to have different functions in operation of the display. For example, display systems of the prior art have included a source of coded data, plural utilization devices for the data, and means to steer the data to one or another of the utilization devices. One utilization device may be a character generator, another an "attribute" decoder. An "attribute" may be some control for the display, such as a field marker to cause following characters to be treated in a given way, such as to be displayed with higher than usual brightness, etc. Whether the bytes of coded data were to represent characters or attributes has been determined by examination of their bit patterns. A flag bit or bit combination would identify a byte as an attribute, and therefore that bit combination would not be available to represent a display character.

Display systems usually employ data bytes of a given size, and this limits the number of distinct codes or "code points" available. For example, an eight bit byte is ordinarily limited to representation of one of a total of 256 characters and attributes. If a character set is to include a large number of symbols, representing numbers, punctuation, upper and lower case alphabetic characters, specially accented characters or compound characters for various languages, and so on, the number of characters in the set can easily approach 256. If at the same time, the number of kinds of attributes or other control bytes desired is substantial, the available number of distinct codes may be exceeded.

This problem is complicated by the fact that in many systems, one or two bits act as "flags" to distinguish between displayable characters and attributes. If a high order "1" bit signals an attribute, than half the byte set is lost for displayable characters; even if the two highest order bits must be a "1", a quarter of the set is lost.

SUMMARY OF THE INVENTION

According to one aspect of the invention, a display system is provided wherein utilization of data is determined, at least in part, by the position the representation of the data is to have on the display screen. According to another aspect of the invention, means are provided to decode, or utilize the decoded representations of, bytes of data in different manners according to that display position.

In a preferred embodiment of the invention, data is stored in a "mapped" buffer, that is, it is stored in the positional order in which it is to be displayed on the display screen. For example, if the display screen format is characterized by horizontal rows of characters, the data bytes representing adjacent characters in a row are stored sequentially in the buffer, and succeeding rows are stored as succeeding sequences of bytes in the buffer. Means including character and row counter circuitry are provided to read the bytes from the buffer sequence and to present resulting characters on the display screen in rows. Some of the bytes may, by their bit format, have indeterminate meanings, however. They may define non-display codes, such as attributes, when in one portion of the mapped buffer, or special display symbols when in another, as determined by the row count. Thus, the row count becomes, in effect, a modifier of the information, as if it were an extra bit on the byte.

This is particularly useful where a special subset of symbols or characters are to appear in a particular portion of the display screen. An indicator row at, for example, the bottom of the screen may desirably employ special symbols indicative of operating conditions not easily conveyed by other characters of the character set. If "attributes" are suppressed in the indicator row anyway, "attribute" codes can be employed to represent symbols of that subset when they are positioned in the indicator row. Thus, the total number of useful "code points" can exceed the number of directly decodable values which would be available from the buffer byte size alone.

Accordingly, one object of the present invention is to provide a display which maximizes utilization of available code patterns.

Another object of the invention is to provide, in a display system as aforesaid, plural use of code points so as to enable enlargement of the effective code set beyond the number of distinct codes available.

Still another object of the invention is to provide a subset of code points which can be interpreted as codes of one class when corresponding to one area of the display screen, and as codes of another class when corresponding to another area of the screen.

Yet another object of the invention is to provide an improved display system as aforesaid wherein code points are provided for display as graphical or special symbols in an indicator part of the display screen, and as attribute or other non-display codes in another part of the display screen.

The foregoing and other objects, features and advantages of the present invention will be apparent from the following description of a preferred embodiment of the invention as illustrated in the accompanying drawings.

DETAILED DESCRIPTION

Figure 1:
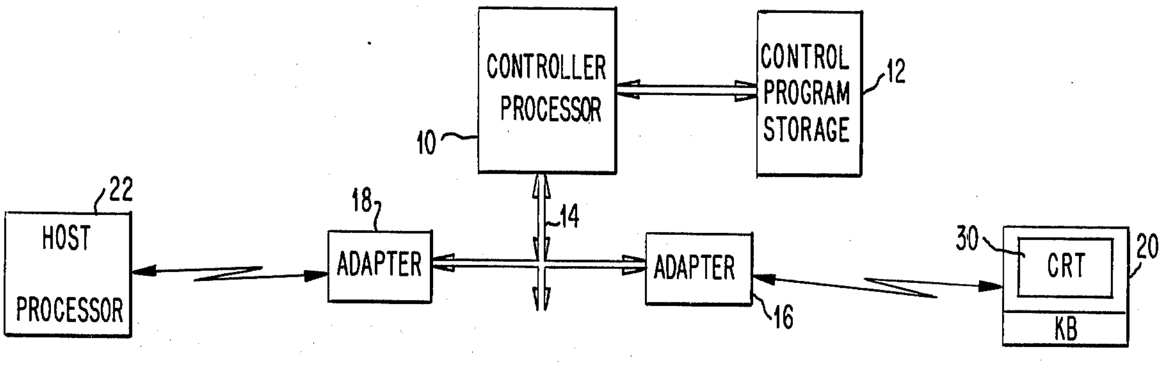
FIG. 1 is a general representation of an information processing system of a kind in which a display station in accordance with the invention can be employed.

In the system configuration of FIG. 1, controller-processor 10 has storage 12 for a program, under the control of which processor 10 responds and transmits to apparatus connected to its I/O bus 14. Bus 14 may be partitioned for control and data in the manner of U.S. Pat. No. 3,996,564, for example, and supports suitable adapters 16, 18 for connection to I/O devices such as a keyboard-CRT display station 20 and to a host computer 22, respectively.

A primary function of the display 30 of station 20 is to output information, in visual form, to the user of the system. As is well known in systems of this general kind, the information outputted may be the result of some keyboard action, a message from the host 22, or operating conditions within the system. The present invention concerns itself especially with means for displaying various classes of information on the screen of display 30.

Figure 2:
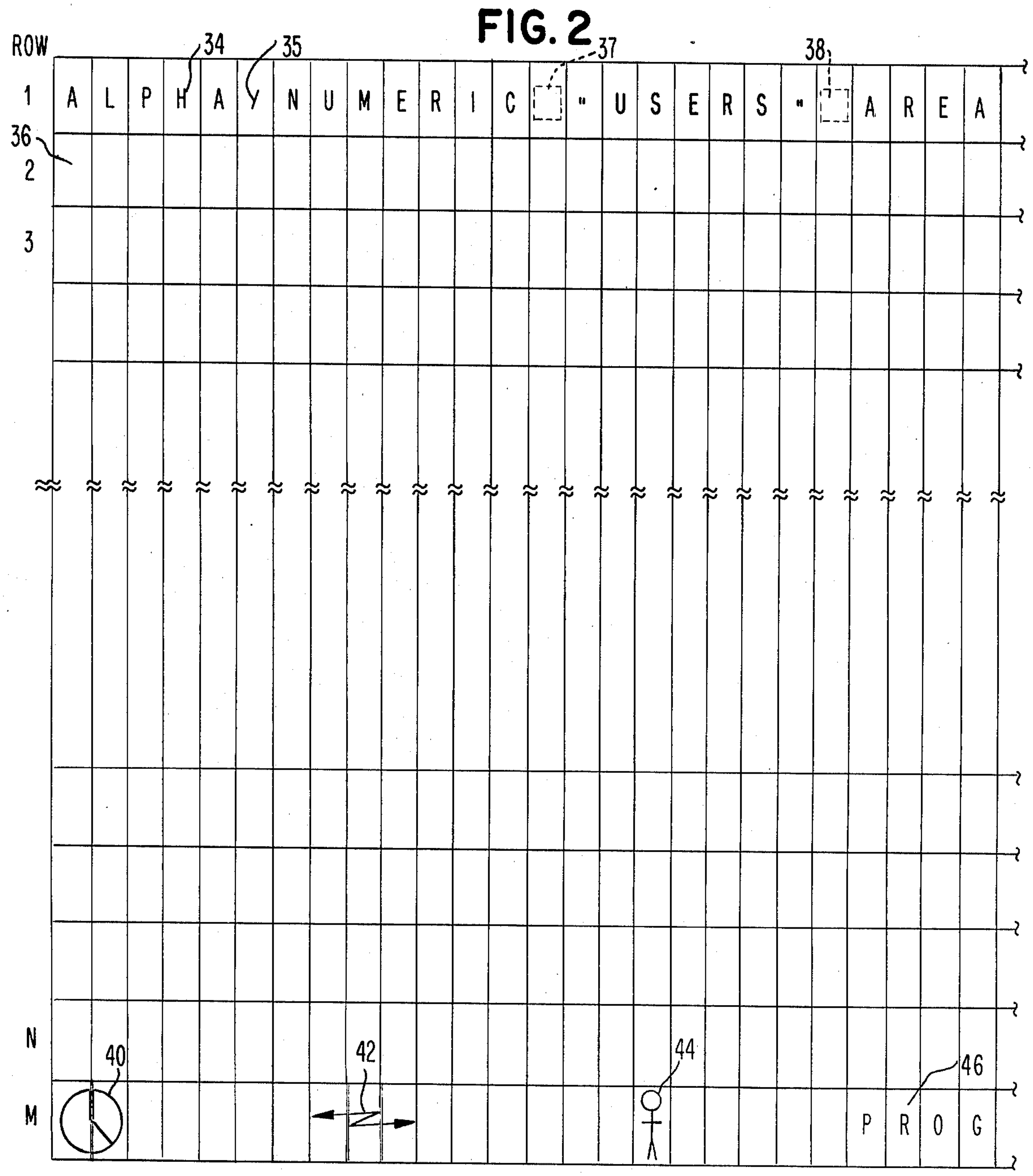
FIG. 2 is a diagramatic representation of the display screen format of a display station of the system of FIG. 1.

FIG. 2 shows, in a schematic way, a display format for display 30, suitable for carrying out objectives of the invention. The box array of character positions shown is for descriptive purposes only; it would not ordinarily contain visable row and column delineator lines. So also, the characters shown are merely representative. The "Users Area" of the display screen is provided with alpha-numeric character positions arranged in rows 1 through N. These character positions may be filled by displayable characters 34, 35 from the user's character set, or by blank spaces 36 corresponding to "nulls", or to non-display "attribute" bytes. Two of the latter are indicated at 37, 38, as will be explained more fully hereinafter.

In addition, there is a portion of the screen for display of a different class of information, in this case indicator information including graphical information indicative of operating conditions within the system. In the illustrated case, indicator information is displayed in row M, and includes symbolic representations of a clock 40, a transmission line 42, and a person 44. Line M may also include messages in ordinary alpha-numeric text, as illustrated at 46.

In the foregoing, the "Users Area" and the "Indicator Row" serve different functions. The display in the Users Area pertains to the work being done by the system for the user, usually in accordance with the user's application program. As is customary, that area of the display may require a large character set including numbers, letters of several languages, punctuation symbols, and commercial symbols of various countries, and also a variety of non-displayable field marker or modifiers, commonly referred to as "attributes".

On the other hand, the "Indicator Row" may be said to belong to the system. It may display a large variety of graphic symbols which show the state of operation of the system, at a glance. For example, the clock symbol 40 may be used to indicate that the system is waiting, such as for access to the host processor 22. Another symbol 42 may indicate a transmission line fault, and a symbol 44 denoting a person may indicate an operator error. For clarity, some of the indicator symbols may in fact require a number of character positions. For example, the person symbol 44 may require only one character position while the left portion of a clock symbol 40 may be one character, while the right portion may be another. The transmission line symbol 42 may require three "characters" (left, middle and right portions of the symbol) to provide its rather wide configuration. In the drawing, the character position delineator lines between the two portions of clock symbol 40 and the three portions of transmission line symbol 42 are shown doubled to indicate the breaks in these symbols. Since the Indicator Row does not require attributes, the invention takes advantage of that fact to use the same code points to represent non-displayable attributes when in the "User's" area of the display, and to represent special displayable indicators or indicator portions when in the Indicator Row.

Figure 3:
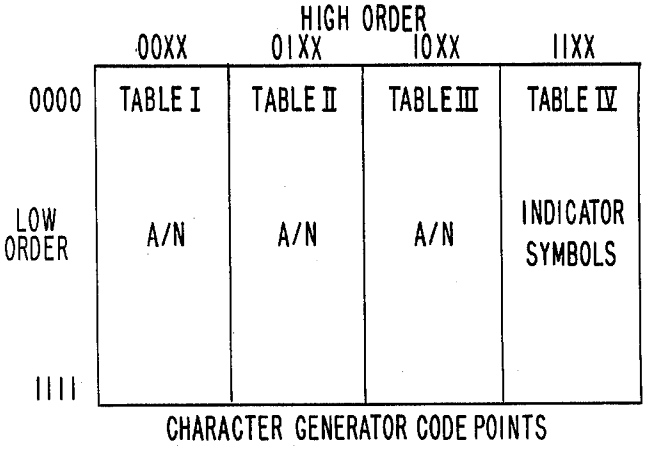
FIG. 3 shows the lay-out of a code point table pertinent to the display requirements of a display format such as shown in FIG. 2.

FIG. 3 shows an eight bit code point matrix to illustrate this principle. The matrix is divided into Tables I, II, III, and IV. Tables I, II, and III contain the regular "Users" alpha-numeric symbol set, and Table IV contains the special indicator symbols. Table IV is characterized by the fact that the bytes which address it have the form "11XXXXXX". That is, the two highest order bits are 1's and the remaining six bits may be any mix of 1's and 0's. This is also the bit pattern of an attribute. The ambiguity is resolved by reference to the screen locations with which the byte is associated.

Figure 4:
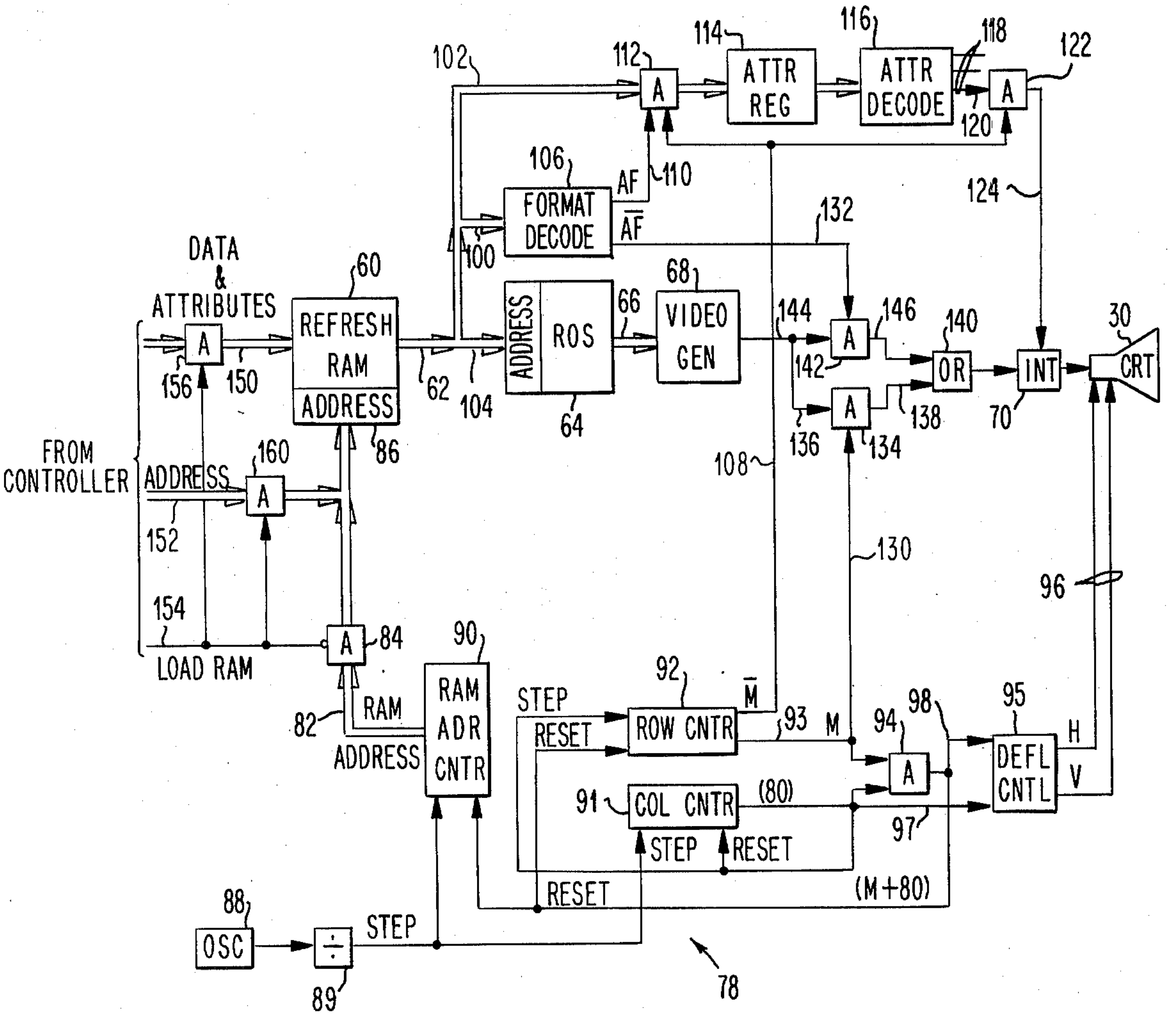
FIG. 4 is a schematic of display control circuitry illustrative of preferred aspects of embodiment of the invention, in a display station of the kind referred to in FIGS. 1 and 2.

FIG. 4 shows a display head having means to make this association. While the general principles of the invention are applicable to a variety of display mechanisms, a well known type of cathode ray tube (CRT) raster display with conventional refresh memory, character generator and clocking controls is shown, so as to clearly illustrate modifications which can be made to a conventional system to enable the practicing of the invention. In that schematic showing, cathode ray tube 30 of FIG. 1 is shown in a raster display system including a refresh memory 60 from which bytes of data are read in sequence via 62 to address a character generator 64 having code point tables of the kind illustrated in FIG. 3. As is conventional in raster displays, the output 66 of character generator 64 constitutes dot pattern information which when applied via video generator 68 and intensity circuit 70 to CRT 30 will generate, in combination with the raster of the display, presentations of successive characters on the display.

The timing of these operations is under the control of coventional clocking and refresh control circuits 78. In the illustrated system, these clocking circuits 78 issue byte addresses via 82 which, when applied through a normally conditioned AND circuit 84 to the address mechanism 86 of refresh memory 60, will cause the addressed byte (whether it be a character designating byte, a null byte, or a non-display attribute byte) to be applied to output bus 62 of that memory. For example, if the rows of character positions in the display each contain 80 positions, byte #1 in refresh memory 60 could designate the first character of the first row and byte #80 could represent the last character of that row while byte #81 could designate the first character of the second row and byte # (80×M) could represent the last character of row M, which then could be followed in the display refresh operation of memory 60 by character #1. Thus, if refresh memory 60 is addressed in a cyclical manner by clocking circuitry 78, a continuous display will be generated on the face of CRT 30. In the schematic showing of FIG. 4, clocking circuitry 78 is shown to be oscillator driven and to comprise appropriate counters for character count, row count, ect., all of which functions are well known in the art. Thus, a basic clocking source such as oscillator 88 provides appropriately divided down pulses via a suitable step down counter circuit 89 to step RAM address counter 90, which controls the sequence by which bytes are read from the refresh (RAM) memory 60 to bus 62. These character count pulses are also fed to Column Counter 91 which, upon reaching a count of 80, resets itself and steps Row Counter 92. Row Counter 92 counts from row #1 to row #M and has an output on line 93 during the period row M is being displayed. This output and its complement, M, are utilized as the major information steering signals in accordance with the invention, as will appear in greater detail hereinafter. As shown, the output on line 93 is combined via AND 94 with the count of 80 from column counter 91 to reset the row and address counters 92, 90 to start a new frame of the display.

For positioning the resulting characters on the screen of CRT 30, deflection controls 95 providing horizontal and vertical deflection of CRT 30 via lines 96 are synchronized by clocking circuits 78 with the operation of refresh memory 60, character generator 64 and video generator 68 according to the kind of character generating system employed. This positioning correlation is indicated at 97, 98 whereby end of row and end of frame from repositioning signals are effected. Some character generators involve addressing of a mask in the CRT to shape the beam thereof to form characters. Others involve the creation of a small raster or vector pattern for each displayed character with that raster or pattern being stepped along the rows of the display format by the horizontal deflection circuits. Others provide multiple accessing of the character information (with suitable buffering of the characters) so that a television type raster can be employed to generate successive "slices" of the character information in timed relationship with an overall raster on the face of the cathode ray tube. Character generators of these various kinds and their specific controls are well known, and since the principles of the present invention do not involve choice among these well known techniques, they will not be described further.

It is, however, a feature of the present invention that the information supplied via bus 62 is decoded and utilized in accordance with the position on the display screen with which it is associated. Accordingly, gating means are provided which are controlled by clocking and refresh circuitry 78 to in effect steer the information, either before or after it is decoded, in accordance with that positional designation. Because timing considerations are usually more critical at the input of character generator 64, where bits are provided in parallel in rapid succession, than at the output thereof, the case wherein the steering control is at the output is the one which is illustrated. Thus, the bytes on bus 62 are applied via busses 100 and 102 to attribute control circuitry in parallel with the input 104 of the addressing circuitry of character generator 64. Bus 100 inputs these bytes to format decoder 106 which tests them for attribute format (AF) of "11XXXXXX", that is a byte format in which the two high order bits are both 1's.

If the byte is in attribute format, it can be utilized as a decoded attribute byte for some non-display function, or it can be utilized as an address of a character in Table IV of FIG. 3, depending upon whether it is in the area of refresh memory 60 corresponding to the display rows 1 through N or is in the area represented by row M. If it is in the "Users Area" of rows 1 through N, the row M output will be present on line 108 which together with the "AF" output on line 110 will enable AND circuit 112 to pass the byte to attribute register 114.

In the illustrated system, attributes, once read from the refresh memory, are active until cancelled, as by being replaced by another attribute. Therefore, attribute register 114 is provided to retain the byte gated to it by AND 112 for continued application to the display as successive character positions are traversed. Accordingly, the byte in attribute register 114 continues to be applied to attribute decoder 116 so as to activate one or more output control lines 118 in accordance with the attribute. One typical attribute is one causing a higher than normal intensity for the display, and such an attribute causes the application of a control signal on line 120 of group 118 via AND circuit 122 to the high intensity control line 124 of intensity control 70. FIG. 2, wherein an attribute 37 causes the characters "USERS" to be hold and attribute 38 causes the characters "AREA" to be displayed at normal intensity.

It will be recalled that it is not desired that attributes be effective during the indicator portion of the display, that is during row M. Accordingly, AND circuit 122 is conditioned only during the presence of a M signal on line 108. However, the signal remains present in the attribute register 114 for application to line 1 when the refresh memory 60 recycles back into the "Users" Area.

Similarly, it is desired that attribute bytes not cause the display of a character. Thus, an AND circuit 142 is interposed in the video path from generator 68 to CRT 30, which AND 142 is conditioned only during an AF signal from decoder signifying that the current byte is not in attribute format.

Complimentary to the row M output on line 108 is a row M output 130 from clocking circuitry 78. This signal operates in an over-ride fashion with respect to (absence of) the AF signal on 132. Thus, if the display is operating in row M, there will be a signal on line 130, and AND circuit 134 will be conditioned providing a bypass via 136, 138 and OR ciruict 140 around the normal video path through AND circuit 142. The video path via line 144, AND circuit 142, and line 146 is the path for "Users" display data, and the path through 136 and AND circuit 134 to line 138 is the path for system indicator display information.

The foregoing assumes a previously loaded RAM. The RAM contents can be updated from time to time, such as by new information written from the control processor of FIG. 1. This is indicated schematically in FIG. 4 by data and address input lines 150, 152 and a LOAD RAM control line 154 operable from the controller in any suitable manner. As shown, AND circuits 156, 160 are enabled by the LOAD RAM signal, and normally conditioned AND circuit 84 is disabled by this signal. In the illustrated arrangement, the refresh addressing via bus 82 is in terms of RAM address and therefore, once the inputting operation to RAM from the controller is complete, refresh operations can continue in synchronism with the deflection control 95.

In use, information originating from the keyboard from the display station or from elsewhere in the system which is of a user's nature, is presented by the screen of cathode ray tube 30 in the usual fashion. Whenever the system has control indicator information to transmit, it can write, via address mechanism 150, 152, etc., into RAM 60 at one or more addresses in row M, special indicator character or characters which connote the system operational condition to be conveyed. If the symbol required is a small one such as seen at 44, FIG. 2, then a single character will suffice. If it is to be of larger size, such as in the case of symbols 40 or 42 of FIG. 2, two or more special characters will be written in adjacent character positions of row M. As shown at 46, characters from the ordinary alpha-numeric set Tables I–III can be displayed in row M as well as these special characters from Table IV.

In the illustrated embodiment of the invention, the display is partitioned into two segments, rows 1 through N and row M. It could be partitioned into segments of more equal size or into several segements, for example, several row groupings. By this means, multiple redundancies in the interpretation of data bytes could be possible. A data byte could be decoded according to one code point set in one row grouping, another in a second row grouping, and still another in a third row grouping, and so on. Thus, while the present embodiment of the invention makes dual use of attribute bytes as "code points" either as true attributes or as otherwise inaccessible character codes, the principles of the invention could be applied to a wide variety of alpha-numeric, arbitrary, and graphical display formats, with redundant use of codes, the ambiguity of which is resolved by position.

In the illustrated embodiment, the order of bytes in buffer 60 is assumed to be one-for-one with that in the display screen character count. Since the read-out of the buffer is shown to be cyclic, it is a simple matter, if desired, to offset the screen reset and buffer address reset by 80 so as to put the indicator bytes at the beginning of the buffer and yet at the last row of the screen, thus, the term "mapped" should be understood to mean an ordered or predetermined positional relationship.

Accordingly, while the invention has been particularly shown and described with reference to a preferred embodiment thereof, it will be understood by those skilled in the art that various changes in form and detail may be made therein without departing from the spirit and scope of the invention.

What is claimed is:

1. In display apparatus having a display medium and a stream of digital information in the form of data bytes coupled to said medium by means including one of plural decoder means to effect display of visually perceptible indicia at locations on said medium, the method of decoding said data bytes comprising:

the step of detecting the locations within said medium at which said indicia are to be displayed, and the further step of using said location as a control to direct a said byte to said one decoder means if said byte relates to a given position on said medium and in the alternative to a different one of said plural decoder means if said byte relates to a different position on said medium.

whereby the byte is used to cause display of corresponding visual data as determined by said one decoder means or not according to said position.

2. The method of claim 1, wherein said control is to determine whether the byte is to be used to cause display of corresponding visual data on said display medium or to be used as a non-display control byte.

3. In a display system, a display buffer, said buffer containing bytes of a first class corresponding to symbols of a first set to be displayed and also bytes of a second class representing, ambiguously, both symbols of a second set and normally non-displayable information, visual indicia generator means addressable by said bytes to cause, selectively, display of symbols of said first and second sets on a display medium according to the information content of said bytes, decoder means operable to be responsive to said bytes of said second class to prevent display of corresponding symbols of a second set, and to produce instead a control function corresponding the second set bytes, and display position determining means connected to selectively operate said decoder means so as to allow display of said corresponding symbols of said second set when said display is operating in a specified portion of said medium, whereby normally non-display bytes are available to cause display of symbols of said second set when said display is operating in certain predetermined positions of said medium.

4. A system in accordance with claim 3, wherein said decoder means is operable to utilize said bytes of said second class as control information.

5. A system in accordance with claim 4, wherein said control information is display attribute information.

6. A system in accordance with claim 4, wherein said symbols of one of said sets are alpha-numeric symbols, and said symbols of said second set are graphical in nature.

7. In a display system, a display buffer, and a display medium for operation thereby, said buffer containing bytes of digitally encoded information mapped on a one-for-one basis with physical locations on said display medium, visual indicia generator means including decoder means addressable by said bytes to cause, selectively, display of symbols of first and second sets on said display medium, and display position determining means connected to selectively operate said decoder means so as to allow display of said corresponding symbols of one said sets only when said display is operating in specified positions of said medium.

8. A system in accordance with claim 7, wherein said decoder means is adapted to yield plural responses to certain of said bytes, and further including means responsive to said position determining means to select between said plural responses.

* * * * *